N. W. SUMRALL & R. C. BIGHAM.
STALK CUTTING ATTACHMENT FOR PLOWS.
APPLICATION FILED APR. 21, 1913.

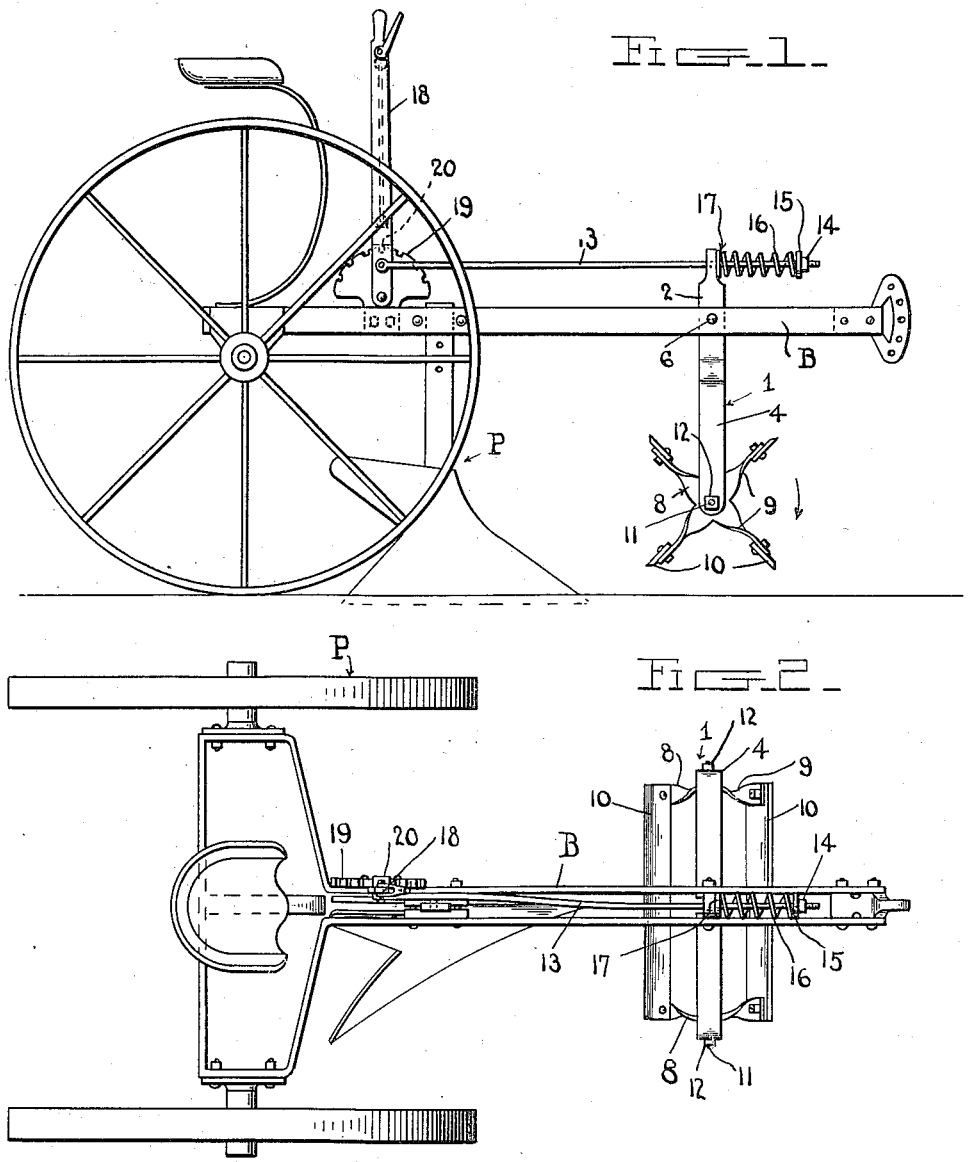

1,081,521.

Patented Dec. 16, 1913.

2 SHEETS—SHEET 2.

Witnesses
L. B. James
C. E. Hunt

Inventors
N. W. Sumrall &
R. C. Bigham
By H. B. Willson & Co.
Attorneys

UNITED STATES PATENT OFFICE.

NAVADA W. SUMRALL AND ROBERT C. BIGHAM, OF ROGERS, TEXAS.

STALK-CUTTING ATTACHMENT FOR PLOWS.

1,081,521.     Specification of Letters Patent.     Patented Dec. 16, 1913.

Application filed April 21, 1913. Serial No. 762,685.

*To all whom it may concern:*

Be it known that we, NAVADA W. SUMRALL and ROBERT C. BIGHAM, citizens of the United States, residing at Rogers, in the county of Bell and State of Texas, have invented certain new and useful Improvements in Stalk-Cutting Attachments for Plows; and we do declare the following to be a full, clear, and exact description of the invention, such as will enable others skilled in the art to which it appertains to make and use the same.

This invention relates to improvements in stalk-cutting attachments for plows.

One object of the invention is to provide an improved construction and arrangement of supporting and attaching mechanism whereby the blades of the device are connected to the machine and held in position to cut or chop the stalks ahead of the plow point, thus permitting the latter to readily turn the stalks under the soil.

Another object is to provide means whereby the cutting mechanism is yieldingly held in position on the plow to permit said mechanism to pass readily over obstructions.

With these and other objects in view, the invention consists of certain novel features of construction, and the combination and arrangement of parts as will be more fully described and claimed.

Figure 3:
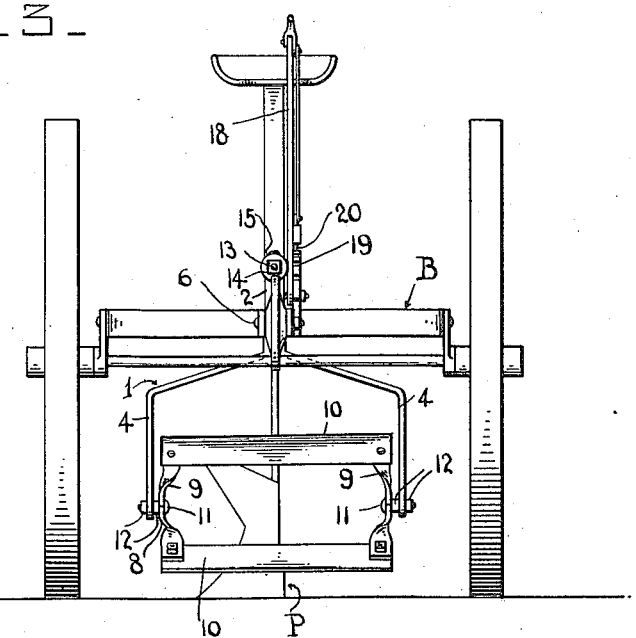
Figure 4:
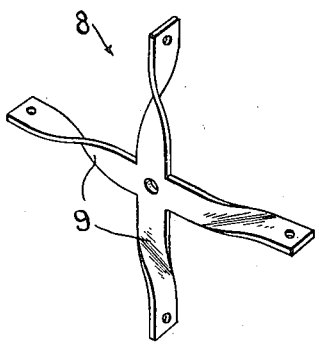
Figure 5:
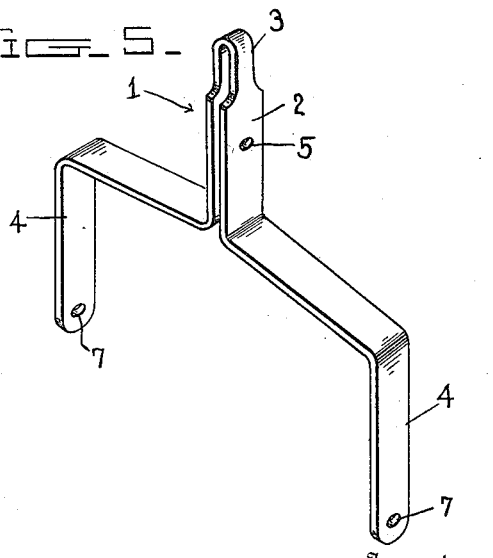

In the accompanying drawings: Figure 1 is a side view of a riding plow showing our improved stalk cutting attachment applied thereto; Fig. 2 is a top plan view of the same; Fig. 3 is a front view thereof; Fig. 4 is a detail perspective view of one of the blade supporting members of the attachment; Fig. 5 is a perspective detail of the supporting frame.

Our improved stalk cutting attachment is designed to be applied to any form of plow, cultivator or similar implement and particularly to riding plows or cultivators. In the present embodiment of the invention the same is shown as applied to a wheeled plow P.

The invention comprises a bail shaped supporting frame 1 which is preferably formed from a single metal bar folded upon itself midway between its ends to form at its center a looped shank 2 the upper end of which is preferably cut away on its opposite edges as shown at 3. After forming the shank 2 the ends of the bar are bent laterally in opposite directions and thence downwardly to form the supporting arms 4 for the rotary cutter hereinafter described. In the sides of the attaching lever or upper end 2 of the supporting frame are formed alined bolt holes 5 with which is engaged a bolt 6. The bolt 6 is also engaged with the beam B of the plow and pivotally connects the frame 1 to the beam. In the present instance the beam B is shown as formed of spaced parallel bars and the shank 2 as being disposed between and pivotally connected to said bars. In the lower ends of the arms of the frame 4 are also formed bolt holes 7.

The cutting mechanism of the attachment comprises blade attaching members 8 each of which preferably comprises right angularly disposed radially projecting arms 9 which are preferably integral or constructed from a single piece of metal as clearly shown in Fig. 4 of the drawings. Each of the arms 9 intermediate its ends is given a half turn or twist whereby the flat sides of the arms are brought into position to receive and form a firm support for the cutting blades 10 which are bolted or otherwise firmly secured at their ends to the ends of the arms as shown. Any desired number of blade supporting arms and blades may be provided, four blades, however, being the preferred number as shown. In the center of the blade supporting members 8 are bearing apertures with which are engaged bearing bolts 11 the outer ends of which are firmly secured in the holes 7 in the arms 4 of the supporting frame by clamping nuts 12 one of which is arranged on each side of the arm as shown. The cutting mechanism when thus constructed and arranged will be supported on the beam at a suitable distance ahead of the plow blade with the upper portion of the shank 2 projecting a suitable distance above the beam as shown. When thus arranged the cutting mechanism is yieldingly held in position to permit the blades thereof to engage and chop the stalks as the machine progresses by an adjusting rod 13 the forward end of which projects through and is slidably engaged with the looped upper end of the shank 2 and has its outer extremity threaded to receive a spring adjusting nut 14 and washer 15 between which and the end of the shank is arranged a coiled spring 16. The inner end of the spring 16 bears against a washer 17 which engages the end of the shank as shown. The rear or inner end of rod 13 is pivotally connected to the lower end of an adjusting lever 18 pivoted at its lower end to a toothed segment 19 secured to the frame of the plow. The lever 18 is provided with a suitable pawl 20 adapted to engage the teeth of the segment 19 whereby the lever and the cutting mechanism are held in their adjusted positions. By means of the lever 18 and the connections herein shown and described it will be seen that the cutting mechanism may be adjusted and held at any desired elevation above the ground and by providing the spring 16, the frame 1 will be yieldingly held and permitted to swing back when the cutting blades come into engagement with an obstruction, thus permitting the revolving portion of the cutting mechanism to give back and pass over obstructions, thereby obviating any danger of the blades being broken.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described our invention, what we claim is:

In a stalk cutting attachment for plows, the combination with the cutter cylinder; of a bail-shaped supporting frame having at its center a looped shank whose sides are pierced with alined bolt holes and whose bent upper end is cut away on its opposite edges, the cylinder being journaled between the pendent arms of said frame and said shank adapted to be pivoted to the plow beam, an adjusting rod passing loosely through said shank and having a nut at its forward end and actuating mechanism at its rearward end, and an expansive spring between said nut and shank, for the purpose set forth.

In testimony whereof we have hereunto set our hands in presence of two subscribing witnesses.

NAVADA W. SUMRALL.
ROBERT C. BIGHAM.

Witnesses:
Thomas B. Moody,
Wm. P. Baugh.

Copies of this patent may be obtained for five cents each, by addressing the "Commissioner of Patents, Washington, D. C."